United States Patent
Tartan et al.

(10) Patent No.: US 12,045,830 B2
(45) Date of Patent: Jul. 23, 2024

(54) PROTOCOL FOR VALIDATING BLOCKCHAIN TRANSACTIONS

(71) Applicant: nChain Licensing AG, Zug (CH)

(72) Inventors: Chloe Tartan, London (GB); Bassem Ammar, London (GB); Jack Davies, London (GB); Jad Wahab, London (GB); Wei Zhang, London (GB); Owen Vaughan, London (GB); Craig Wright, London (GB)

(73) Assignee: nChain Licensing AG, Zug (CH)

( * ) Notice: Subject to any disclaimer, the term of this patent is extended or adjusted under 35 U.S.C. 154(b) by 321 days.

(21) Appl. No.: 17/611,550

(22) PCT Filed: Apr. 23, 2020

(86) PCT No.: PCT/IB2020/053844
§ 371 (c)(1),
(2) Date: Nov. 15, 2021

(87) PCT Pub. No.: WO2020/240300
PCT Pub. Date: Dec. 3, 2020

(65) Prior Publication Data
US 2022/0261805 A1    Aug. 18, 2022

(30) Foreign Application Priority Data
May 24, 2019   (GB) ..................... 1907345

(51) Int. Cl.
G06Q 20/40    (2012.01)
G06Q 20/02    (2012.01)
H04L 9/00     (2022.01)

(52) U.S. Cl.
CPC .......... G06Q 20/407 (2013.01); G06Q 20/02 (2013.01); H04L 9/50 (2022.05)

(58) Field of Classification Search
CPC ......... G06Q 20/407; G06Q 20/02; H04L 9/50
See application file for complete search history.

(56) References Cited

U.S. PATENT DOCUMENTS 6,578,192 B1   6/2003  Boehme et al.
10,693,637 B2  6/2020  Ramesh
(Continued)

FOREIGN PATENT DOCUMENTS

WO   2017145006 A1   8/2017
WO   2018116104 A1   6/2018
(Continued)

OTHER PUBLICATIONS

Bartoletti et al. "An Analysis of Bitcoin OP_RETURN Metadata" (Year: 2017).*
(Continued)

*Primary Examiner* — Wissam Rashid
(74) *Attorney, Agent, or Firm* — Messner Reeves LLP

(57) ABSTRACT

A method of validating transactions for recordal in a blockchain comprises receiving one or more transactions at a node of a blockchain network. For each received transaction a protocol for validating the transaction is applied. The protocol is configured to allow a termination opcode to be included in an output script of the transaction. The termination opcode is configured to, upon being executed by the node, a) terminate execution of the output script, and b) not to invalidate the transaction based only on the inclusion of the termination opcode in the output script. The protocol is also configured to disallow any instance of the termination opcode from being included in an input script of the transaction, said disallowing comprising the node at least invalidating the transaction if any instance of the termination opcode is included in the input script.

20 Claims, 8 Drawing Sheets

| Initiation Transaction | | |
|---|---|---|
| Input 0 | Value | x |
| | Unlocking script | <Sig $P_1$> <$P_1$> <$r_1$> OP_DROP |
| Input 1 | Value | x |
| | Unlocking script | <Sig $P_2$> <$P_2$> <$r_2$> OP_DROP |
| ... | | |
| Input N-1 | Value | x |
| | Unlocking script | <Sig $P_N$> <$P_N$> <$r_N$> OP_DROP |
| Number of outputs | | 1 |
| Output 0 | Value | N x x |
| | Locking script | OP_DUP OP_HASH160 <Hash160($P_0$)> OP_EQUALVERIFY OP_CHECKSIG |

(56) References Cited

U.S. PATENT DOCUMENTS

| | | | |
|---|---|---|---|
| 2019/0102758 A1 | 4/2019 | Wright et al. |
| 2019/0116024 A1 | 4/2019 | Wright et al. |
| 2019/0156301 A1 | 5/2019 | Bentov et al. |
| 2021/0233074 A1 | 7/2021 | Kramer et al. |

FOREIGN PATENT DOCUMENTS

| | | | |
|---|---|---|---|
| WO | 2018116105 A1 | 6/2018 |
| WO | 2018215872 A1 | 11/2018 |
| WO | 2018215951 A1 | 11/2018 |
| WO | 2019034959 A1 | 2/2019 |
| WO | 2019043538 A1 | 3/2019 |
| WO | 2019092552 A1 | 5/2019 |

OTHER PUBLICATIONS

Marvin Minsky, Computation: Finite and Infinite Machines, 1967, Prentice-Hall, Inc., Englewood Cliffs, N.J.
Anonymous, "OP_CHECKSIG—Bitcoin Wiki," Jan. 16, 2019 [Retrieved on Jan. 14, 2020], 6 pages, Retrieved from the Internet: URL: https://en.bitcoin.it/w/index.php?title=OP_CHECKSIGoldid=66023.
Bitfury Group: "Smart Contracts on Bitcoin Blockchain", Sep. 4, 2015, [retrieved on Jun. 9, 2017] 20 pages. Retrieved from the Internet: URL: http://bitfury.com/content/5-white-papers-research/contracts-1.1.1.pdf.
Combined Search and Examination Report under Sections 17 and 18(3) for Application No. GB1907345.1 mailed on Nov. 14, 2019, 7 pages.
Combined Search and Examination Report under Sections 17 and 18(3) for Application No. GB1907346.9 mailed on Feb. 20, 2020, 9 pages.
Combined Search and Examination Report under Sections 17 and 18(3) for Application No. GB1907347.7 mailed on Nov. 18, 2019, 7 pages.
International Search Report and Written Opinion for Application No. PCT/IB2020/053816 mailed on Jul. 17, 2020, 15 pages.
International Search Report and Written Opinion for Application No. PCT/IB2020/053817 mailed on Jun. 24, 2020, 12 pages.
International Search Report and Written Opinion for Application No. PCT/IB2020/053844 mailed on Jun. 24, 2020, 12 pages.
Sward A., et al., "Data Insertion in Bitcoin's Blockchain," Published in Ledger 3, Script. 4. Transaction Malleability. OP return. 6. Coinbase. 7. Free speech, Jul. 2017, XP055464096, p. 5, paragraph 3, p. 6, p. 9, 19 pages.
Covaci A., et al., "NECTAR: Non-Interactive Smart Contract Protocol Using Blockchain Technology," IEEE/ACM 1st International Workshop on Emerging Trends in Software Engineering for Blockchain (WETSEB), 2018, pp. 17-24, Retrieved from the Internet: URL: https://ieeexplore.ieee.org/document/8445053.
"Interpreter," Bitcoin, [Accessed on Apr. 24, 2019], 33 pages, Retrieved from the Internet: URL: https://github.com/bitcoin/bitcoin/blob/master/src/script/interpreter.cpp.
"Maguines," Bitcoin-v0.1, [Accessed on Apr. 24, 2019], 8 pages, Retrieved from the Internet: URL: https://github.com/Maguines/Bitcoin-v0.1/blob/master/study/script.cpp.
Minsky M., "Computation: Finite and Infinite Machines," 1967, pp. 354-355.
"Srcipt," Bitcoin Wiki, [Accessed on Apr. 24, 2019], 13 pages, Retrieved from the Internet: URL: https://en.bitcoin.it/wiki/Script.
Shadders, "The Unfuckening of OP_RETURN," Yours, [Accessed on Apr. 24, 2019], 5 pages, Retrieved from the Internet: URL: https://www.yours.org/content/the-unfuckening-of-op_return-b10d2c4b52da.
Andreas M. Antonopoulus: "Mastering Bitcoin—Unlocking Digital Cryptocurrencies" In: "Mastering bitcoin : [unlocking digital cryptocurrencies]", Dec. 20, 2014, pp. 132-134, O'Reilly Media, Beijing Cambridge Farnham Koln Sebastopol Tokyo.
EP23159633.9 Search Report dated Jun. 9, 2023, 5 pages.
Ali N.A., et al., "Alneelain: A Formal Specification Language," 2017 International Conference on Communication, Control, Computing and Electronics Engineering (ICCCCEE), 2017, pp. 1-9, Retrieved from the Internet: URL:https://ieeexplore.ieee.org/stamp/stamp.jsp?tp=amp;arnumber=7867678.
Jamthagen C., et al., "Blockchain-Based Publishing Layer for the Keyless Signing Infrastructure," 2016, International IEEE Conferences on Ubiquitous Intelligence Computing, Advanced and Trusted Computing, Scalable Computing and Communications, Cloud and Big Data Computing, Internet of People, and Smart World Congress, pp. 1-8, Retrieved from the Internet: URL:https://ieeexplore.ieee.org/stamp/stamp.jsp?tp=&arnumber=7816868.
Fuchita Y., "Special Feature: Innovation and Finance—Blockchain and Financial Transaction Innovation," Nomura Capital Markets Quarterly, Japan, Nomura Institute of Capital Markets Research, Nov. 1, 2015, vol. 19, No. 2, 30 Pages.
Matsuura K., et al., "Introduction: How to Make Cryptocurrencies," 1st Printing, 1st Edition, Japan, Shuwa System Co., Ltd, Dec. 25, 2018, 11 Pages.
Narayanan A., et al., (Nagao, Takahiro), F, Nd Printing, St Edition, Japan, Nikkei Business Publications, Inc., Dec. 20, 2017, 17 Pages.
Stone System Corporation., "Illustrated Introduction: Up-to-date Easy-to-understand Guide to Blockchain," 4th Printing, 1st Edition, Japan, Shuwa System Co., Ltd, Apr. 15, 2018, 18 Pages.

* cited by examiner

Figure 5a

| Initiation Transaction |||
|---|---|---|
| Input 0 | Value | $x$ |
| | Unlocking script | $<Sig\ P_1> <P_1> <r_1>$ OP_DROP |
| Input 1 | Value | $x$ |
| | Unlocking script | $<Sig\ P_2> <P_2> <r_2>$ OP_DROP |
| | | ... |
| Input N-1 | Value | $x$ |
| | Unlocking script | $<Sig\ P_N> <P_N> <r_N>$ OP_DROP |
| Number of outputs | | 1 |
| Output 0 | Value | N x $x$ |
| | Locking script | OP_DUP OP_HASH160 $<Hash160(P_0)>$ OP_EQUALVERIFY OP_CHECKSIG |

Figure 5b

| Oracle Transaction |||
|---|---|---|
| Input 0 | Value | N x $x$ |
| | Unlocking script | $<Sig\ P_0> <P_0>$ |
| Number of outputs | | 2 |
| Output 0 | Value | N x $x$ |
| | Locking script | $<P_1> <P_2> ... <P_N>$<br><br>$<s_1> <s_2> ... <s_N>$ OP_ADD ... OP_ADD OP_HASH256 $<N>$ OP_MOD OP_ROLL OP_TOALTSTACK OP_DROP ... OP_DROP OP_FROMALTSTACK OP_CHECKSIG |
| Output 1 | Value | 0 |
| | Locking script | $<H(r_1)><H(r_2)> ... <H(r_N)>$ OP_EQUALVERIFY ... OP_EQUALVERIFY<br><br>$<s_1> <s_2> ... <s_N>$ OP_ADD ... OP_ADD OP_HASH256 $<N>$ OP_MOD OP_RETURN |

Figure 7

Example: (105, 28)

| 28  | OP_TUCK | 28  | OP_MOD | 21 | OP_DUP | 21 | OP_IF | 21 | OP_TUCK |
|-----|---------|-----|--------|----|--------|----|-------|----|---------|
| 105 |         | 105 |        | 28 |        | 21 |       | 28 |         |
|     |         | 28  |        |    |        | 28 |       |    |         |
|     |         |     |        |    |        |    |       |    |         |

| 21 | OP_MOD | 7  | OP_DUP | 7  | OP_IF | 7  | OP_TUCK |
|----|--------|----|--------|----|-------|----|---------|
| 28 |        | 21 |        | 7  |       | 21 |         |
| 21 |        |    |        | 21 |       |    |         |
|    |        |    |        |    |       |    |         |

| 7  | OP_MOD | 0 | OP_DUP | 0 | OP_IF | 0 | OP_ENDIF | 7 |
|----|--------|---|--------|---|-------|---|----------|---|
| 21 |        | 7 |        | 0 |       | 7 | OP_ENDIF |   |
| 7  |        |   |        | 7 |       |   | OP_ENDIF |   |
|    |        |   |        |   |       |   | OP_DROP  |   |

Figure 8

Example: (5, G)

| G | OP_TOALTSTACK [DECIMAL_TO_BINARY] |
|---|---|
| 5 | OP_FROMALTSTACK |
|   |   |
|   |   |
|   |   |

| G | OP_0 |
|---|---|
| 1 | OP_TOALTSTACK |
| 0 | OP_SWAP |
| 1 |   |
| 2 |   |

| 1 | 0 | OP_IF |
|---|---|---|
| G |   | OP_DUP |
| 0 |   | OP_TOALTSTACK |
| 1 |   | OP_1 |
| 2 |   | OP_TOALTSTACK |

| G | 1 | OP_SWAP |
|---|---|---|
| 0 | G | OP_DUP |
| 1 | 0 | OP_IF |
| 2 |   |   |

| 0 | 1 | OP_DROP |
|---|---|---|
| G | G | [POINT_DOUBLE] |
| 1 | 0 |   |
| 2 |   |   |

| 2G | 1 | OP_SWAP |
|----|---|---|
| 1  | G | OP_DUP |
| 2  | 0 | OP_IF |
|    |   |   |

| 1  | 1 | OP_1 |
|----|---|------|
| 2G | G | OP_EQUAL |
| 2  | 0 | OP_IF |
|    |   |   |

| 2G | 1 | [POINT_DOUBLE] |
|----|---|----------------|
| 2  | G | OP_DUP |
|    | 0 | OP_TOALTSTACK |
|    |   | OP_1 |
|    |   | OP_TOALTSTACK |

| 4G | 1  | OP_SWAP |
|----|----|---------|
| 2  | 4G | OP_DUP |
|    |    | OP_IF |
|    | 1  |   |
|    | G  |   |
|    | 0  |   |

| 2  | 1  | OP_1 |
|----|----|------|
| 4G | 4G | OP_EQUAL |
|    | 1  | OP_IF |
|    | G  |   |
|    | 0  |   |

| 4G | 1  | OP_DROP |
|----|----|---------|
| 0  | 4G | OP_FROMALTSTACK |
|    | 1  |   |
|    | G  |   |
|    | 0  |   |

| 1 | 4G | OP_IF |
|---|----|-------|
|   | 1  | OP_FROMALTSTACK |
|   | G  |   |
|   | 0  |   |

| 4G | 1 | OP_FROMALTSTACK |
|----|---|-----------------|
|    | G | OP_IF |
|    | 0 | OP_FROMALTSTACK |

| G  | 0 | [POINT_ADD] |
|----|---|-------------|
| 4G |   |   |

| 5G | 0 | OP_FROMALTSTACK |
|----|---|-----------------|
|    |   | OP_IF |

| 5G |
|----|
|    |

PROTOCOL FOR VALIDATING BLOCKCHAIN TRANSACTIONS

CROSS REFERENCE TO RELATED APPLICATIONS

This application is the U.S. National Stage of International Application No. PCT/IB2020/053844 filed on Apr. 23, 2020, which claim the benefit of United Kingdom Patent Application No. 1907345.1, filed on May 24, 2019, the contents of which are incorporated herein by reference in their entireties.

TECHNICAL FIELD

The present disclosure relates to the implementation of a protocol for validating transactions of a blockchain.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction points back to a preceding transaction in a sequence, going back to a genesis block at the beginning of the blockchain. Transactions can be submitted to the network to be included in new blocks. New blocks are created by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, then the transaction (including any user data) will thus remain stored at each of the nodes in the P2P network as an immutable public record.

The miner who successfully solved the proof-of-work puzzle to create the latest block is typically rewarded with a new transaction called a "generation transaction" which generates a new amount of the digital asset. The proof-of work incentivises miners not to cheat the system by including double-spending transactions in their blocks, since it requires a large amount of computational resource to mine a block, and a block that includes an attempt to double spend Is likely not be accepted by other nudes.

In an "output-based" model (sometimes referred to as a UTXO-based model), the data structure of a given transaction comprises one or more inputs and one or more outputs. Any spendable output comprises an element specifying an amount of the digital asset, sometimes referred to as a UTXO ("unspent transaction output"). The output may further comprise a locking script specifying a condition for redeeming the output. Each input comprises a pointer to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the P2P network to be propagated and recorded in the blockchain, one of the conditions for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it nor include it for mining into a block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the miners separate to the blockchain and is updated constantly.

Blockchain protocols may use a scripting language for transactions. A script is essentially a list of elements, which may be data or instructions. The instructions are referred to in the literature as, script words, opcodes, commands, or functions. Opcodes (short for operation codes) perform predefined operations on the data within a script.

SUMMARY

One such opcode is OP_RETURN. In the original blockchain protocol the purpose of OP_RETURN was to terminate execution of a script. It did not invalidate the transaction containing the script. However, this led to fraudulent attacks when OP_RETURN was included in the input script(s) of a transaction. Specifically, any input script of a transaction that contained an OP_RETURN could have been used to unlock an output script of a previous transaction. Therefore the protocol was changed so that, in the existing blockchain protocol, the opcode OP_RETURN represents a provably unspendable transaction output, allowing for the storage of data on the blockchain. In the existing protocol, the OP_RETURN opcode is used to terminate the execution of a script and to invalidate the transaction simultaneously. However this results in a loss of functionality within the blockchain because no transaction having an OP_RETURN in its input script can result in a 'TRUE' (or valid) execution when run alongside any unlocking script.

According to one aspect disclosed herein, there is provided a method of validating transactions for recordal in a blockchain, the method comprising receiving one or more transactions at a node of a blockchain network, and for each received transaction applying a protocol for validating the transaction, wherein the protocol is configured to: allow a termination opcode to be included in an output script of the transaction, wherein the termination opcode is configured to, upon being executed by the node, a) terminate execution of the output script, and b) not to invalidate the transaction based only on the inclusion of the termination opcode in the output script; and disallow any instance of the termination opcode from being included in an input script of the transaction, said disallowing comprising the node at least invalidating the transaction if any instance of the termination opcode is included in the input script.

For each of a plurality of transactions including the target transaction, at least some nodes of the network are configured to Propagate each transaction on condition of the transaction being valid and at least some nodes are configured to record each transaction in the copy of the blockchain at that node on condition of the transaction being valid. The validity of a transaction is conditional on the above protocol, according to which, when a specific opcode is called only the script terminates and crucially, the transaction is not invalidated. For instance, the validity of the transaction may depend on the top element of a stack.

For brevity, the termination opcode will be referred to hereinafter as "OP_RETURN". However, the disclosure is not limited to an opcode having that specific label. More generally, while embodiments will be described in terms of "OP_RETURN" of a blockchain scripting language, the same teaching can be implemented using any opcode which when called by a script engine (e.g. script interpreter) performs a particular function, the function being to terminate execution of a script whilst not invalidating the transaction. Reference to first and second instances of the opcode should be interpreted as instances of the same type of opcode.

The protocol regains functionality of a transaction by allowing input scripts to validly execute when run alongside an output script, whilst preventing fraudulent attacks by ensuring that any input script having an OP_RETURN cannot be used to unlock any output script.

The node is configured to validate or invalidate a transaction which it processes based on the above protocol. That is, when the node processes a transaction, the inclusion of OP_RETURN in an output script (or more than one output script) of the transaction will result in the termination of the output script when OP_RETURN is called. The inclusion of OP_RETURN in the output script does not invalidate the transaction. The transaction may be invalidated for some other reason. On the other hand, the node is configured to always invalidate the transaction if OP_RETURN is included in an input script of the transaction. Here, the inclusion of OP_RETURN in any input script will result in the transaction being invalidated. In some examples, before executing the script, the node scans for any instance of OP_RETURN in the input script and if any such instance is present, the node is configured to invalidate the transaction, i.e. before executing the input script.

Each type of node of the blockchain network may implement the same protocol. The node of the blockchain network may be, for example, a mining node, a forwarding node or a storage node, each having one or more of the same functions, as will be discussed below. For instance, if the node is a forwarding node, the forwarding node may only forward the transaction to one or more nodes of the blockchain network on condition of the transaction being valid according to the protocol, included at least the condition of there being no OP_RETURN opcodes in any of the input scripts of the transaction.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 5a illustrates an example initiation transaction $Tx_{in}$ where each input has a commitment r from a player;

FIG. 5b illustrates an example oracle transaction $Tx_{Oracle}$ where Output 0 transfers digital assets to the participants and output 1 yields a random number;

FIG. 7 is an example of unpacking loops from a composite script function of the Euclidean algorithm for inputs a=105 and b=28; and FIG. 8 is an example of an elliptic curve point multiplication with inputs 5, G, where the Alt stack (shown shaded) is shown alongside the Main stack.

DETAILED DESCRIPTION OF EMBODIMENTS

Figure 1:
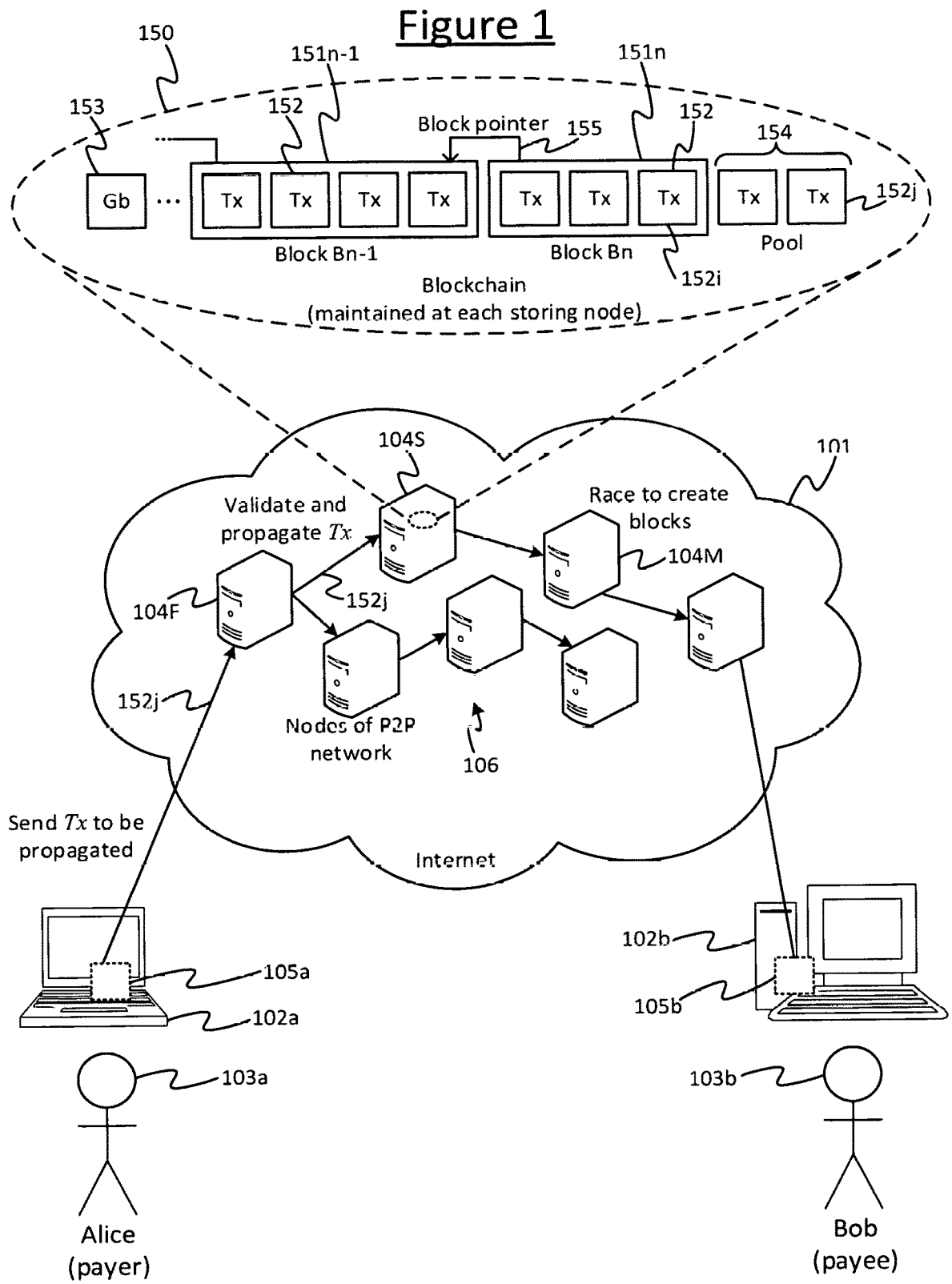
FIG. 1 is a schematic block diagram of a system for implementing a blockchain.

FIG. 1 shows an example system 100 for implementing a blockchain 150. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the pool 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the signature of the user 103a to whom the output of the preceding transaction 152i is locked. In turn, the output of the present transaction 152j can be cryptographically locked to a new user 103b. The present transaction 152j can thus transfer the amount defined in the input of the preceding transaction 152i to the new user 103b as defined in the output of the present transaction 152j. In some cases a transaction 152 may have multiple outputs to split the input amount between multiple users (one of whom could be the original user 103a in order to give change). In some cases a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed in the transaction. This data field may point back to a previous transaction, for example if the previous transaction ID is included in the data field.

With either type of transaction protocol, when a user 103 wishes to enact a new transaction 152j, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152j matches the expected signature, which depends on the previous transaction 152i in an ordered sequence of transactions 152. In an output-based case, this may comprise checking that the cryptographic signature of the user included in the input of the new transaction 152j matches a condition defined in the output of the preceding transaction 152i which the new transaction spends, wherein this condition typically comprises at least checking that the cryptographic signature in the input of the new transaction 152j unlocks the output of the previous transaction 152i to which the input of the new transaction points. In some transaction protocols the condition may be at least partially defined by a custom script included in the input and/or output. Alternatively it could simply be fixed by the node protocol alone, or it could be due to a combination of these. Either way, if the new transaction 152j is valid, the current node forwards it to one or more others of the nodes 104 in the P2P network 106. At least some of these nodes 104 also act as forwarding nodes 104F, applying the same test according to the same node protocol, and so forward the new transaction 152j on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152j according to the node protocol. Another condition for a transaction to be valid is that the output of the preceding transition 152i which it attempts to spend or redeem has not already been spent/redeemed by another valid transaction. Again if not valid, the transaction 152j will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151*n* pointing back to the previously created block 151*n*-1 in the chain. The proof-of-work helps reduce the risk of double spending since it takes a large amount of effort to create a new block 151, and as any block containing a double spend is likely to be rejected by other nodes 104, mining nodes 104M are incentivized not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151*n*, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151*n*. This reward gives an incentive for the miners 104M to participate in the proof-of-work race. Often a regular (non-generation) transaction 152 will also specify an additional transaction fee in one of its outputs, to further reward the winning miner 104M that created the block 151*n* in which that transaction was included.

Due to the computational resource involved in mining, typically at least each of the miner nodes 104M takes the form of a server comprising one or more physical server units, or even a whole data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application or software 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

The instance of the client application 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152*j*, it handles it in accordance with the node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any storage node 104S that receives the transaction 152*j* will add the new validated transaction 152 to the pool 154 in the copy of the blockchain 150 maintained at that node 104S. Further, any forwarding node 104F that receives the transaction 152*j* will propagate the validated transaction 152 onward to one or more other nodes 104 in the P2P network 106. Since each forwarding node 104F applies the same protocol, then assuming the transaction 152*j* is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Different nodes 104 may receive different instances of a given transaction first and therefore have conflicting views of which instance is 'valid' before one instance is mined into a block 150, at which point all nodes 104 agree that the mined instance is the only valid instance. If a node 104 accepts one instance as valid, and then discovers that a second instance has been recorded in the blockchain 150 then that node 104 must accept this and will discard (i.e. treat as invalid) the unmined instance which it had initially accepted.

Figure 2:
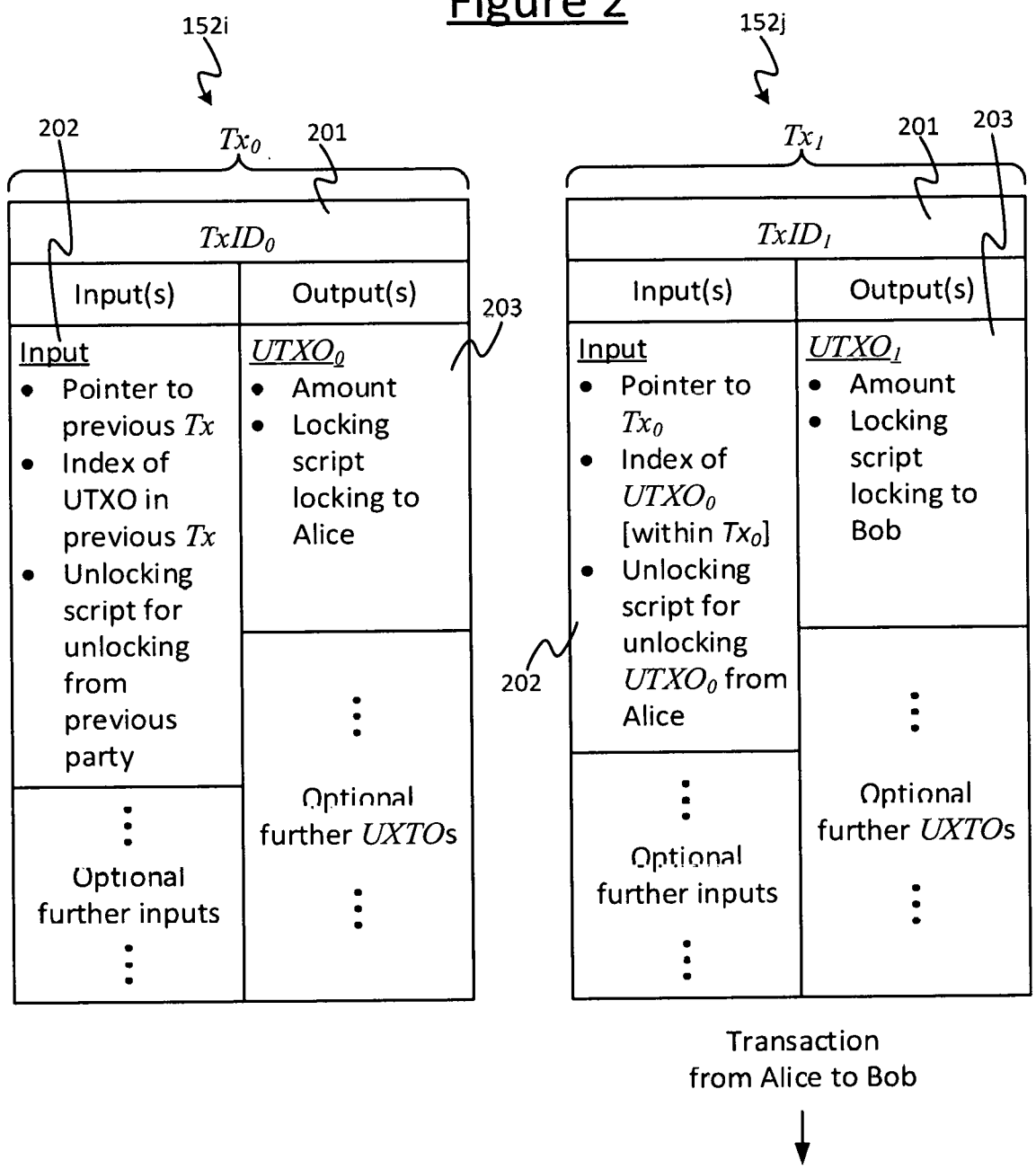
FIG. 2 schematically illustrates some examples of transactions which may be recorded in a blockchain.
Figure 3:
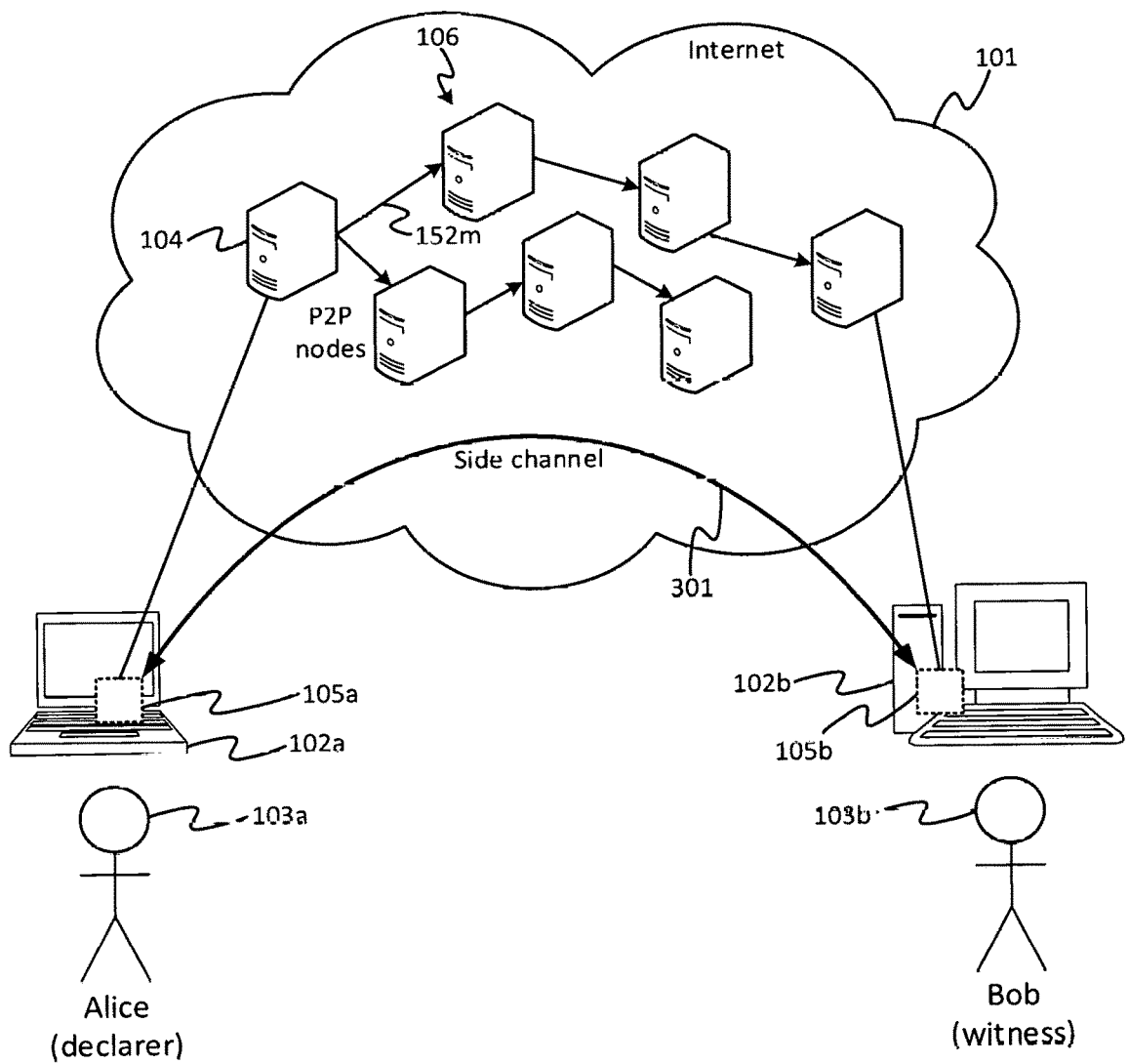
FIG. 3 is a schematic block diagram of another system for implementing a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written in the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_0$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "| |" represents a concatenation and "< . . . >" means place the data on the stack, and "[ . . . ]" is a function comprised by the unlocking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ in order to perform this authentication. In embodiments the signed data comprises the whole of $Tx_0$ (so a separate element does not need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a storage node 104S, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor mined into blocks 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160 <H($P_A$)>OP_EQUALVERIFY OP_CHECKSIG. "OP_" refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Validation Protocol

Figure 4:
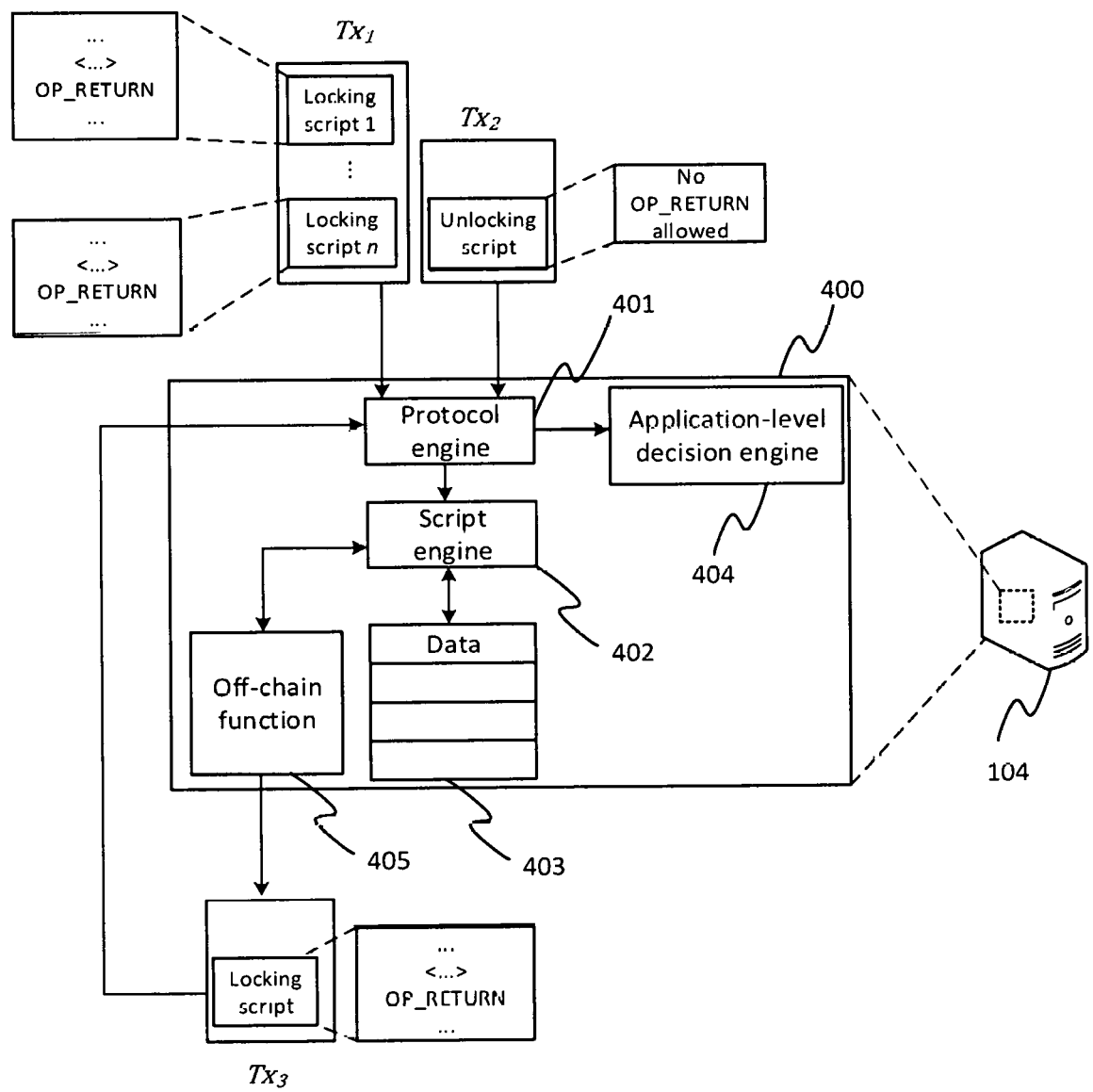
FIG. 4 is a schematic block diagram of node software for executing transactions.

FIG. 4 illustrates an example of the node software 400 that may be run on each node 104 of the P2P network 106, in the example of a UTXO- or output-based model. The node software 400 comprises a protocol engine 401, a script engine 402, a stack 403, an application-level decision engine 404, and a set of one or more blockchain-related functional modules (not shown). At any given node 104, these may include any one, two or all three of: a mining module, a forwarding module and a storing module (depending on the role or roles of the node). The script engine 402 may comprise a script interpreter configured to execute scripts by interpreting parts of the script as data elements or functions for operating on those data elements and/or pushing or reading data elements from the stack 403. Alternatively the script engine 402 could employ another form of execution such as just-in-time (JIT) compilation. Generally, the term "execute" is used herein in its broadest sense of running the script in any way (not in the narrow sense of executing compiled machine code instructions). Hence "executing" can comprise interpreting in the present context. Note also that "opcode" in the present context does not mean the opcode of an individual machine code instruction but rather a higher level command that is mapped to a respective predefined function by the script engine 402 at each node 104.

The protocol engine 401 is configured to recognize the different fields of a transaction 152 and process them in accordance with the node protocol. When a transaction 152$m$ (Tx$_m$) is received having an input pointing to an output (e.g. UTXO) of another, preceding transaction 152$m$-1 (Tx$_{m-1}$), then the protocol engine 401 identifies the unlocking script in Tx$_m$ and passes it to the script engine 402. The protocol engine 401 also identifies and retrieves Tx$_{m-1}$ based on the pointer in the input of Tx$_m$. It may retrieve Tx$_{m-1}$ from the respective node's own pool 154 of pending transactions if Tx$_{m-1}$ is not already on the blockchain 150, or from a copy of a block 151 in the blockchain 150 stored at the respective node or another node 104 if Tx$_{m-1}$ is already on the blockchain 150. Either way, the protocol engine 401 identifies the locking script in the pointed-to output of Tx$_{m-1}$ and passes this to the script engine 402.

The script engine 402 thus has the locking script of Tx$_{m-1}$ and the unlocking script from the corresponding input of Tx$_m$. For example Tx$_1$ and Tx$_2$ are illustrated in FIG. 4, but the same could apply for any pair of transactions, such as Tx$_0$ and Tx$_1$, etc. The script engine 402 runs the two scripts together as discussed previously, which will include placing data onto and retrieving data from the stack 403 in accordance with the stack-based scripting language being used (e.g. Script).

By running the scripts together, the script engine 402 determines whether or not the unlocking script meets the one or more criteria defined in the locking script—i.e. does it "unlock" the output in which the locking script is included? The script engine 402 returns a result of this determination to the protocol engine 401. If the script engine 402 determines that the unlocking script does meet the one or more criteria specified in the corresponding locking script, then it returns the result "true". Otherwise it returns the result "false".

In an output-based model, the result "true" from the script engine 402 is one of the conditions for validity of the transaction. Typically there are also one or more further, protocol-level conditions evaluated by the protocol engine that must be met as well; such as that the total amount of digital asset pointed to by the input(s) of Tx$_m$ does not exceed the total amount specified in the output(s), and that the pointed-to output of Tx$_{m-1}$ has not already been spent by another valid transaction. The protocol engine evaluates the result from the script engine 402 together with the one or more protocol-level conditions, and only if they are all true does it validate the transaction Tx$_m$. The protocol engine outputs an indication of whether the transaction is valid to the application-level decision engine 404. Only on condition that Tx$_m$ is indeed validated, the decision engine 404 may select to control one or both of the mining module and the forwarding module to perform their respective blockchain-related function in respect of Tx$_m$. This may comprise the mining module adding Tx$_m$ to the node's respective pool 154 for mining into a block 151, and/or the forwarding module forwarding Tx$_m$ to another node 104 in the P2P network 106. Note however that in embodiments, while the decision engine 404 will not select to forward or mine an invalid transaction, this does not necessarily mean that, conversely, it is obliged to trigger the mining or the forwarding of a valid transaction simply because it is valid. Optionally, in embodiments the decision engine 404 may apply one or more additional conditions before triggering either or both of these functions. E.g. if the node is a mining node 104M, the decision engine may only select to mine the transaction on condition that the transaction is both valid and leaves enough of a mining fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model (not illustrated in FIG. 4), a result of "true" could be indicated by a combination of an implicit, protocol-level) validation of a signature by the node 104 and an additional affirmative output of a smart contract (the overall result being deemed to signal true if both individual outcomes are true).

According to some embodiments, one condition for a valid transaction is that the unlocking script of that transaction cannot contain any instances of the OP_RETURN opcode, or any other such termination opcode that does not mark the transaction invalid. The protocol engine 401 and/or the script engine 402 are configured to detect the presence of such an opcode within the unlocking script of a transaction. Upon detecting a termination opcode in an unlocking script of a transaction, e.g. Tx$_2$, the protocol engine 401 is configured to mark the transaction as invalid. If a termination opcode is detected in an unlocking script, the transaction is immediately marked invalid—the script is never executed.

In additional or alternative embodiments, the node software comprises an off-chain function 405. Here, the protocol engine 401, script engine 402, application-level decision engine 404 may be said to "on-chain" functions. On-chain does not mean that the function is actually included in a block 151. Rather, it means the function is integrated as part of the protocol for validating transactions to be propagated over the network 106 and mined into blocks 151. Conversely, off-chain means that the function serves a purpose other than the validation of blocks. In some examples, the purpose is to generate new transactions, to generate template scripts comprising composite functions, or to perform a computation on data taken from (or resulting from) a transaction Tx.

In these embodiments, the script engine 402 is configured to supply a data element from the stack 403 (e.g. from the top of the stack) to the off-chain function 405. The script engine 402 is configured to read the data element from the stack 403 upon calling an OP_RETURN present in the locking script of the transaction, which is Tx$_1$ in FIG. 4. The off-chain function 405 is configured to generate a result based on the data element (or put another way, perform an operation on the data element). In some examples, the data element is read from the stack 403 and recorded on an "off-chain stack". Here, the "off-chain stack" is a stack that is not used for the purpose of validating transactions. A data element may be read from the stack 403 and supplied to the off-chain function each time an OP_RETURN is called by the script engine 402. The off-chain function 405 may be configured to generate a new transaction using the data element recorded on the off-chain stack. In other examples, the off-chain function 405 is configured to use the data element as a reference to a locking script within $Tx_1$. As shown in FIG. 4, $Tx_1$ comprises multiple locking scripts 1 to n. The off-chain function 405 interprets the data element as an address or index of the locking scripts (e.g. as an index of the third locking script), and then executes that locking script. Additionally or alternatively, the addressed locking script may be added to a script template, which is saved in memory.

As detailed above, a transaction must fulfil several requirements in order to be a valid transaction, and therefore in order to be propagated throughout and mined onto the blockchain. Embodiments of the present invention relate to the implementation of a modification to the protocol which sets out conditions for the validity of a transaction. The modification to the conditions for validity of a transaction relate to the inclusion of a particular type of operation code (opcode) in the transaction.

Blockchain protocols use a scripting language which comprises two types of elements: data and opcodes. The data within a script may be, for example, numbers, public keys, signatures, hash values, etc. An opcode is a function that operates on the data within a script. In scripting language, a script is run from one end to the other (usually from left to right) and makes use of a data structure referred to as a "stack". Data is always pushed to (i.e. placed on) the stack. An opcode can pop data off the stack (i.e. take data from the stack), perform an operation on the data, and then optionally "push" new data on to the stack. The stack-based scripting language commonly used in a number of blockchains is just called Script. The following will be described in terms of opcodes of the Script language.

Stack-based scripting languages will be familiar to the person skilled in the art. The following example illustrates how an example script implementation. Specifically, an example verification and unlocking process is shown.

An example script may comprise <Bob's signature> <Bob's public key> OP_DUP OP_HASH <Bob's public address> OP_EQUALVERIFY OP_CHECKSIG. The script is operated on from left to right.

Step 1: Push <Bob's signature> on to the stack

| <Bob's signature> |
|---|

Step 2: Push <Bob's public key> on to the stack (this is now the top element on the stack)

| <Bob's public key> |
|---|
| <Bob's signature> |

Step 3: The OP_DUP opcode operates on the top element on the stack to duplicate <Bob's public key>.

| <Bob's public key> |
|---|
| <Bob's public key> |
| <Bob's signature> |

Step 4: The OP_HASH opcode pops out <Bob's public key> and runs it through a hash algorithm (followed by one or more optional operations) to get <Bob's public address> and place it on the stack.

| <Bob's public address> |
|---|
| <Bob's public key> |
| <Bob's signature> |

Step 5: Push <Bob's public address> to the stack (this is now the top element on the stack).

| <Bob's public address> |
|---|
| <Bob's public address> |
| <Bob's public key> |
| <Bob's signature> |

Step 6: The OP_EQUALVERIFY opcode pops the last two elements off the stack (<Bob's public address> and <Bob's public address>) and checks to see if the two addresses are identical or not. If they are not identical the execution is considered as failed. If the condition is TRUE, the next command gets executed.

| <Bob's public key> |
|---|
| <Bob's signature> |

Step 7: The OP_CHECKSIG opcode pops out <Bob's public key> and <Bob's signature> and checks to see their validity. When this process is complete, Bob can unlock the transaction and access the specified amount of digital asset.

| TRUE |
|---|

One particular opcode is the OP_RETURN opcode. In the original blockchain protocol, OP_RETURN had one primary function, to terminate execution of a script. This meant that nothing following an OP_RETURN opcode would ever be executed, and that the final state of the stack would be exactly as it was at the point when OP_RETURN acted. For instance, when the script [<X> OP_RETURN (Y)] was executed, the script element <Y> would never have been executed, and the script would terminate with <X> left at the top of the (main) stack.

However, this protocol was vulnerable to two attacks:
1) Any locking script starting with OP_RETURN could be redeemed using the unlocking script [OP_1], or an unlocking script with the same effect where the top stack item is 'truthy'.
2) Any locking script could be redeemed using the unlocking script [OP_1 OP_RETURN], because the locking script would not be executed (i.e. it follows an OP_RETURN).

To mitigate the attacks described above, a later protocol (the existing protocol) changed the function of OP_RETURN so that its function was both to terminate execution of a script and to fail execution. This is achieved by first marking a script as invalid and then terminating execution. An advantage of this is that OP_RETURN can be used to create provably unspendable outputs, because no locking script containing OP_RETURN can ever result in a 'TRUE' execution when run alongside any unlocking script. A 'TRUE' execution (i.e. the top element on the stack represents a true outcome, e.g. the value 1) is required for a transaction to be valid.

This property of the existing protocol has had two major effects on usage of the blockchain:
1) Data storage—any data that follows OP_RETURN is never executed by miners or validators. This means that it can be of any type and format, without needing to be compatible with the constraints of a stack-based scripting language. For instance, the usual 520-byte limit on data elements that applies to scripts does not apply when preceded by an OP_RETURN.

2) Pruning—because any OP_RETURN output is provably unspendable, there is as yet no real incentive for a miner to retain data relating to these outputs. This has led to miners selectively pruning (i.e. not keeping) OP_RETURN UTXO data or metadata.

The new protocol as implemented by the nodes according to embodiments of the invention impose at least two conditions on the use of OP_RETURN:
1) OP_RETURN is allowed to be included in an output script of a valid transaction.
2) OP_RETURN is not allowed to be included in an input script of a valid transaction.

Now, according to embodiments, the function of OP_RETURN is to terminate execution of a script without invalidating the transaction. That is, now when OP_RETURN is called, the script Is halted, leaving the stack unchanged.

When validating transactions, the node will not invalidate the transaction solely on the basis of there being an OP_RETURN in the output script in the output 203 of a transaction. Conversely, the node will invalidate a transaction solely on the basis of there being an OP_RETURN in the input script in an input 202 of a transaction. If the transaction has more than one input, it is enough for only one of those inputs to have an input script containing an OP_RETURN for the node to invalidate the transaction. If the locking script comprises an OP_RETURN, the transaction is never executed—it is invalidated without execution.

Referring to FIG. 1, a first party Alice 103*a* may generate a transaction comprising one or more inputs and/or one or more outputs. As shown in FIG. 2, each input may have an unlocking script for unlocking a locking script from a previous transaction. Each output may have a locking script for locking an amount of digital asset to a respective second party, e.g. Bob 103*b*, which will be unlocking by an unlocking script of a later transaction. Alice 103*a* transmits the transaction to the nodes of the P2P network. A forwarding node 104F checks the transaction for validity before propagating the transaction to one or more other forwarding nodes or to a mining node 104M. Alternatively, the mining node 104M may receive the transaction directly from Alice 103*a*. Each node determines whether or not the transaction is valid at least based on the above protocol. If the transaction satisfies the requirements of the protocol in terms of the use of OP_RETURN (and one or more other requirements of the protocol), the transaction will be propagated throughout the network and/or mined to the blockchain.

In some embodiments, OP_RETURN may only be allowed in a locking script of a transaction. Similarly, in some embodiments, OP_RETURN may only be disallowed from an unlocking script of a transaction. As discussed above each transaction comprises one or more inputs which may each have an unlocking script, and one or more outputs which each may have a locking script. The unlocking script of a given transaction unlocks a locking script of some previous transaction.

When implementing the protocol, if the node validates the transaction it means, amongst fulfilling other conditions, the transaction does not contain any OP_RETURNs in any input scripts. Validation of the transaction results in a non-empty and a non-zero result on the stack after executing a combination of an unlocking script from the transaction and a locking script from a different transaction. Validation of the transaction additionally or alternatively results in the node forwarding the transaction to one or more nodes of the network, e.g. to a miner for mining to the blockchain. Another result of validating the transaction, if the node is a miner, is for the miner to mine (i.e. record) the transaction in a block of the blockchain.

The protocol as defined herein advantageously prevents fraudulent attacks and preserves compatibility with existing functionality of the blockchain (i.e. data storage applications). Fraudulent attacks are prevented by ensuring that OP_RETURN cannot exist in the unlocking script of a transaction. Existing functionality may be achieved by including <0> before an OP_RETURN in an output (e.g. locking script) of a transaction. Here, <0> is any element that results in zero being pushed to the stack. For instance, a zero opcode OP_0 may be placed before OP_RETURN. This creates a provably unspendable transaction output i.e. by inserting [OP_0 OP_RETURN <arbitrary data>] in the locking script of a transaction. The arbitrary data may be, for instance, one or more of image data, text data, video data, and audio data. As an example, a video file or legal document may be included in the output of a transaction.

A further advantage of allowing OP_RETURN to validly execute when in output script is to provide off-block (or off-chain) functionality, as described below.

Script elements in a locking script before the OP_RETURN (i.e. those executed before OP_RETURN) is called (or executed) can be used as inputs to an off-chain function. In other words, when a locking script is executed, there will be data left on the at least one stack (e.g. Main stack or Alt stack). This data can be read from the stack(s) and supplied to a function for off-chain purposes.

For instance, the function may generate a new transaction based on the data as read from the stack. The data may be read from the stack(s) and recorded on a "Return" stack, i.e. a stock separate from the Main and Alt stacks:

As another example, the data left on the stack may be used as a reference to another part of the transaction. For instance, the data may be interpreted by the function as an index (or address) of an output within the transaction. The function may then execute the locking script contained in the referenced output. In this sense, the function operates as an "off-chain script interpreter" that identifies and executes locking scripts. This can be used to create off-chain loops.

Generating a New Transaction

In some embodiments, the function is configured to generate a new transaction based on the data element. The new transaction may be generated and transmitted at any point after the first transaction is executed. The function may generate the transaction directly based on the data element or by first performing an operation on that data element. The new transaction may be transmitted to one or more nodes 104 of the blockchain network 106 for propagation throughout the network and/or recordal in the blockchain.

As an example, the function may generate at least part of one of the inputs of the new transaction (e.g. a public key, a signature, a random variable). Additionally or alternatively, the function may generate at least part of one of the outputs of the new transaction (e.g. an amount of digital asset to transfer).

The new transaction may comprise an output having a locking script. That locking script may comprise a portion of script to be executed before an OP_RETURN is called. At least part of the locking script may be based on the data element supplied to the off-chain function. Again, when OP_RETURN is called the locking script will terminate and a new data element will be left on the stack. This data element may be read from the stack and supplied to the off-chain function, e.g. to generate a further transaction. This enables a loop of transactions to be constructed, where each of the further transactions is based on the data element resulting from the execution of the previous transaction's locking script.

In an example blockchain script there are two stacks, the Main Stack and the Alt Stack. When verifying transactions, scripts are executed on the stacks. During the execution, it is not possible to write anything to the stacks other than the pre-determined script. However, it is recognised herein that it is possible to read the data from the stacks using an external function (or agent) just after the execution ends. The following describes the use of a third stack: an off-chain stack referred to as a "Return Stack". The functionality of the Return Stack is to read and record data from Main Stack and Alt Stack after execution of scripts, e.g. to link the blockchain with the external world. The data stored on Return Stack can then be fed to an off-chain function to provide additional functionality, e.g. to be fed into the next script execution, to generate a new transaction, or for some other off-chain computation. Whilst the terminology "stack" is used, any data storage that is configured to store data read from the main or alt stacks may be used.

Use Case—Craps

The following example of simulating a casino game called Craps is provided to illustrate the interaction between Return Stack and blockchain transactions. The example involves two entities, the Casino, Charlie, and the player, Alice. Each of these may be a respective party 103. In this simplified examples, a game of craps plays as follows: one player, the 'shooter', take two dice and throw them on a craps table—or presses 'roll' button if playing online craps.

Once the first number is rolled, there are three possible outcomes:

1. Natural—A 'Natural' means that the result of the roll is a 7 or an 11. When this happens, the player wins and gets to roll the dice again.

2. Craps—A 2 (also known as the Snake Eyes), 3, or 12 is rolled. When this happens, the player loses.

However the round is not over, and the player gets to roll again.

3. Point—The player rolls a 4, 5, 6, 8, 9, or 10. In a live casino, a dealer would mark a 'Point' (the rolled number) on the table. In online craps games, there is a small button that appears once the Point is established. It is usually white and says 'On'. The player now needs to roll the dice once more and hope that they hit the same number again. It doesn't have to be the same combination of dice as rolled before. As long as it's the same sum—the player wins. If the player rolls a 7, the player 'sevens out'—they lose and end the betting round.

To make the game even simpler, in this example the outcomes "Natural" and "Craps" will end the game. Consider the initial transaction $TX_0$ below, created by Alice and Charlie.

| $TX_0$ | |
|---|---|
| Inputs | Outputs |
| Alice's bet | OP_DUP OP_HASH <Hash of $PK_1$> OP_EQUAL OP_CHECKSIG<br>OP_IF<br>  [CHECK_RANDOM_STRING]<br>  OP_IF<br>    OP_HASH <6> OP_MOD OP_RETURN<br>  OP_ELSE<br>    OP_DUP OP_HASH <Hash of $PK_{Charlie}$><br>    OP_EQUALVERIFY OP_CHECKSIGVERIFY<br>  OP_END_IF<br>OP_ELSE<br>  OP_DUP OP_HASH <Hash of $PK_{Charlie}$> OP_EQUALVERIFY<br>  OP_CHECKSIGVERIFY<br>OP_ENDIF |
| Charlie's bet | OP_DUP OP_HASH <Hash of $PK_2$> OP_EQUAL OP_CHECKSIG<br>OP_IF<br>  [CHECK_RANDOM_STRING]<br>  OP_IF<br>    OP_HASH <6> OP_MOD OP_RETURN<br>  OP_ELSE<br>    OP_DUP OP_HASH <Hash of $PK_{Charlie}$><br>    OP_EQUALVERIFY OP_CHECKSIGVERIFY<br>  OP_END_IF<br>OP_ELSE<br>  OP_DUP OP_HASH <Hash of $PK_{Charlie}$> OP_EQUALVERIFY<br>  OP_CHECKSIGVERIFY<br>OP_ENDIF |

Remarks on $TX_0$:

1) There are two inputs in $TX_0$: Alice's bet and Charlie's bet.
2) There are two outputs in $TX_0$: each output represents one die. It is possible to combine the two outputs into one. However, having two outputs emphasises that there are two dice, and that more than one person to "throw" the dice.
3) It is assumed that Alice is the only player to throw the dice. That is to say Alice knows both private keys to $PK_1$ and $PK_2$. To allow other players to throw, $PK_2$ can be replaced with a public key of the other player's choice.
4) To prevent Alice from cheating, Alice's public keys could be replaced with 2-out-of-2 MultiSig, in which case both Alice's and Charlie's signatures are required.
5) In each output, there are two OP_IF's. If the top stack value is not False, the statements are executed. The top stack value is removed.
  a. The first one is to check the validity of the signature. If it is true, then proceed to "throwing". If it is not true, then Charlie can claim the output. Note that it is assumed that Charlie is trusted by the players. If this is not the case, a lock time can be implemented to ensure that Alice has the priority to claim the output.

b. The second one is to check the validity of the random string provided in an unlocking script. This can be a check on the prefix of the string via a hash puzzle. For example:
   i. [CHECK_RANDOM_STRING]:="get_first_4_bytes OP_HASH <pre-determined hash value>OP_EQUAL".
c. If the random string is not valid, then Charlie can claim the output.

6) Assuming that the random string is valid and indeed random, then the script "OP_HASH <6> OP_MOD" will produce a number in the range {0, 1, 2, 3, 4, 5} with almost equal probability. These outcomes represent the six outcomes from a die {1, 2, 3, 4, 5, 6}.

To simulate the throw, Alice needs to construct two unlocking scripts. Alice then passes this incomplete transaction TX, to Charlie. Charlie completes the transaction $TX_1$ by adding two random strings.

| $TX_1$ - Incomplete | |
|---|---|
| Inputs | Outputs |
| $TX_0$ - first output < $Sig_1$ > < $PK_1$ > $TX_0$ - second output < $Sig_2$ > < $PK_2$ > | OP_DUP OP_HASH <Hash of $PK_{betpool}$> OP_EQUALVERIFY OP_CHECKSIGVERIFY |

| $TX_1$ - Complete | |
|---|---|
| Inputs | Outputs |
| $TX_0$ - first output < random_string_1 > < $Sig_1$ > < $PK_1$ > $TX_0$ - second output < random_string_2 > < $Sig_2$ > < $PK_2$ > | OP_DUP OP_HASH <Hash of $PK_{betpool}$> OP_EQUALVERIFY OP_CHECKSIGVERIFY |

It is assumed that $PK_{betpool}$ is controlled by the casino and Charlie is trusted to provide two fresh random strings.

When $TX_1$ is validated, one of the script executions will look like this:

```
< random_string_1 > < Sig_1 > < PK_1 >
OP_DUP OP_HASH <Hash of PK_1> OP_EQUAL OP_CHECKSIG
OP_IF
[CHECK_RANDOM_STRING]
OP_IF
OP_HASH <6> OP_MOD OP_RETURN
OP_ELSE
OP_DUP OP_HASH <Hash of PK_Charlie> OP_EQUALVERIFY OP_CHECKSIGVERIFY
OP_END_IF
OP_ELSE
OP_DUP OP_HASH <Hash of PK_Charlie> OP_EQUALVERIFY OP_CHECKSIGVERIFY
OP_ENDIF
```

The existing version of OP_RETURN would end the script and invalidate the transaction when OP_RETURN is called. However, in the OP_RETURN implemented by the nodes of the embodiments described herein, the OP_RETURN will mark the transaction valid, and leave a number on the stack after the execution and before the stacks are cleared. The numbers left on the stacks will be read and stored on Return Stack.

Suppose Alice has thrown a and b, where a, b∈(1, 2, 3, 4, 5, 6). All of the Craps rules can be implemented in a script for off-chain evaluation (e.g. the off-chain function). A pseudo code would look like this:

1) If (a + b) = 7 or 11, then "Natural".
2) If (a + b) = 2, 3, or 12, then "Craps".
3) Else, save (a + b) on Return Stack, and "Point"

Each outcome corresponds to a new transaction. By interpreting the outcome from the Return Stack, the outcome transaction can be constructed:

Natural—The transaction simply pays Alice the winning prize from the output in $TX_1$.

Craps—The transaction redeems the output in $TX_1$: that is to pay Charlie.

Point—The transaction will create another transaction similar to $TX_1$, which will allow Alice to throw again.

Note that in this example use case, Natural Transaction or Craps Transaction ends the game, while in the case of a Point transaction, the game continues. The most important thing is that the output of the first throw (the sum of a and b) is stored on the Return Stack. In other words the outcome is the data element that is read from the stack and stored on the return stack. The output of the second throw will then be compared to a+b. If they are equal, a transaction will be created for Alice to claim the prize. If not, another transaction like $TX_0$ will be created for Alice to throw once again.

In summary, by having a Return Stack, a complicated while-loop can be simulated. Note that this loop exists off-chain and playing Craps is an example of how this loop can be implemented. The use of a Return Stack can be generalised to many other applications, as demonstrated in the following example.

Use Case—Jury Selection

The example relates to a method of using a group of N participants to achieve random number generation (RNG) in a blockchain script. The method involves a minimum of two transactions:

a) Initiation (first) transaction $Tx_{in}$—each participant adds and signs an input to the initiation transaction, which includes a public commitment r to a secret value s. This transaction pays its digital asset to an oracle.

b) Oracle (second) transaction $Tx_{Oracle}$—the oracle (the off-chain function) obtains the secret value s from each player and generates a transaction whose locking script combines the secret values of all N players to generate a random number $R_N$ (the first data element), and locks digital assets to a public key according to that number.

The random number $R_N$ generated in the locking script of the oracle transaction can be used to determine the conditions for a subsequent redemption transaction to spend these digital assets. However, because $R_N$ is provably pseudo-random, it may be used to seed other off-chain processes, such as a laboratory experiment that requires a seed for a deterministic process. In particular, the provably-fair selection of a jury in criminal trial proceedings could make use of this solution.

The use of a provably-fair random number in an off-chain jury selection, generated by an on-chain locking script, is further aided by introducing Return stack to execute such locking scripts and return the final random number $R_N$ to the off-chain interpreter.

A court can be assumed responsible for selecting juries to sit in legal proceedings for criminal cases, whereby the selection is to be done randomly so as to ensure the jury cannot be 'packed' or unfairly biased in any way. The court operates may operate hardware and software, which have the capability to run an off-chain Return stack. In addition, the court can read data from the blockchain, execute transaction scripts and store the result of these executions in its local Return stack. The process as defined by the court to select the jury from the pool of N possible jurors is derived from random numbers generated using the on-chain method outlined above. However, the court need not be involved in the generation process itself and instead acts as a third-party observer of the blockchain, in which case the RNG process is run by another third-party T e.g. a lottery company.

Each time a jury is to be selected for a criminal trial, the following process occurs:
1) The court requests an on-chain RNG process from a service provider T:
    a. An initiation transaction $Tx_{In}$, involving N participants, is organised and broadcast by T, and
    b. An oracle transaction $Tx_{Oracle}$ is generated and broadcast by T.
2) The court retrieves $Tx_{In}$ and $Tx_{Oracle}$ from the blockchain.
3) The court executes the locking script of $Tx_{Oracle}$ using an unlocking script:
    a. The unlocking script is generated by extracting all of the r values from $Tx_{In}$, and
    b. The unlocking script is extracted from $Tx_{Oracle}$.
4) The top (Main) stack item $R_N$ (first data element) is copied to the court's Return stack and stored.
5) The court's Return stack (the off-chain stack) is used to select the jury e.g. the item from the stack is fed to an off-chain function that takes successive hashes of the random number $R_N$ and maps the results to the IDs of eligible citizens.

In order to achieve step 4, OP_RETURN must be included in the $Tx_{Oracle}$ locking script so it can be used to terminate the script execution in step 3. Moreover, it is also required that OP_RETURN is equipped with the functionality of terminating execution and not invalidating the transaction to ensure that the top stack item is $R_N$ when the script execution terminates. If OP_RETURN was instead to invalidate the transaction, the court interpreter will be met with an error at termination rather than the desired random number.

The transactions involved in this scenario are shown in FIGS. 5a and 5b.

The court is able to extract the list of commitments $r_1, \ldots, r_N$ from the inputs of the initiation transaction $Tx_{In}$ and use them as the unlocking script during step 3 of the jury selection process:

[unlocking script]=$<r_1><r_2>\ldots <r_N>$

Similarly, the court extracts the locking script output 1 of the oracle transaction $Tx_{Oracle}$, which is written as:

[locking script] = $<H(r_1)> <H(r_2)> \ldots <H(r_N)>$ OP_EQUALVERIFY ... OP_EQUALVERIFY
$<s_1> <s_2> \ldots <s_N>$ OP_ADD ... OP_ADD OP_HASH256 $<N>$ OP_MOD
OP_RETURN The first line of this locking script is used to check that the committed r-values are consistent with the initiation transaction. The second line then uses the secret s-values, as committed to by the r-values, to generate the random number $R_N$ during the script execution process. Finally, the third line is simply an OP_RETURN call, which causes the script execution to terminate and therefore leaves $R_N$ on the top of the main stack.

In step 3 of the jury selection process, the court will execute the above locking and unlocking scripts together, which will either return the random number $R_N$ or the execution will fail. In the case that the execution successfully runs to completion, the court is then able to read off the random value from the top of Main stack and store it in their local machine's Return stack.

This value $R_N$ is then used to select the jury in a manner that is provably fair. The entire process can be repeated each time a jury selection is required, and each time the generation of $Tx_{In}$ and $Tx_{Oracle}$ can either be supervised by the court or outsourced to a third party.

The main advantage of this approach is transparency. The public will be able to read the transactions on chain to witness that the process is indeed random and unbiased.

Composite Functions

In some embodiments, a first transaction (referred to below as a previous transaction) may have a plurality of outputs, each of which contain a locking script (some of which may be the same or different). Each output is referenced by an output address (OA), also referred to as an outpoint address below. This address may be a number indexing the position of the output in the transaction. At least one of the outputs has a locking script comprising an output address which references a different one of the outputs. For instance, a locking script may contain a number (e.g. 2) or an opcode (e.g. OP_2) which may be interpreted, when coupled with an OP_RETURN, as an address of the second output (e.g. second in a list of outputs).

A second transaction (referred to below as a new, or further transaction) which is generated at some point after the first transaction, comprises one or more inputs, each having an unlocking script. At least one of those unlocking scripts references an output of the previous transaction (referred to below as the first or main output). The first output need not be the first in the list of outputs of the previous output, the label. "first" is merely used to signify that the output is the first one to be called.

When executing the unlocking script, the locking script of the first output is referenced and executed. The locking script of the first output comprises at least an output address (OA) (i.e. a data element which can be interpreted as an output address) of an output of the same transaction. The output may be the same output (i.e. the first output), or a different output (e.g. a second output). Here, a second output does not necessarily mean, although it could, that the second output is the second output in the list of outputs of the previous transaction. The label "second" is merely used to signify that the output is the second one to be called. The locking script of the first output also comprises at least an OP_RETURN opcode. The locking script may also comprise additional data elements or opcodes.

Due to the OP_RETURN being configured to terminate execution of a script without invalidating the transaction, when the OP_RETURN is called, the output address of the second output will remain on the stack. In some examples, the output address within a locking script is immediately followed by the OP_RETURN, i.e. there are no data elements or opcodes between the output address and the OP_RETURN. The off-chain function is configured to read the data element left on the stack and interpret it as an output address of one of the outputs (in this case the second output).

The function may then execute the locking script of the second output. Note here that in contrast to the usual execution of locking scripts, the locking script of the second output is not executed alongside an unlocking script. This is because the function is "off-chain", such that the purpose of executing the locking script is not to validate a transaction for the purposes of transmitting the transaction to nodes of the blockchain network of mining into the blockchain. Instead, one advantage is construct a script, e.g. to implement in a locking script or a smart contract.

The locking script of the second output may also comprise an output address, e.g. of a third output, followed by an OP_RETURN. Again, "third" here is used as a label to distinguish between the first and second and does not imply an order of outputs within the previous transaction. However it is not excluded that the first, second and third outputs are part of an ordered sequence of outputs of the previous transaction. In this case, when the locking script of the second output is executed, the output address of the third output is pushed to the stack. The output address may be a number or other data element which the function is configured to interpret as an output address of one of the outputs, in this case the third output. The off-chain function may then use the third output address to reference a locking script of the third output.

The process of executing a locking script may be repeated one or more times. Whenever an OP_RETURN is called, the data element on the top of the stack is interpreted as an output address of one of the outputs. One or more of the outputs of the previous transaction may be executed more than once. The process may end when each of the output's respective locking scripts have been executed. In some examples not every output of the previous transaction is referenced by either the unlocking script of the second transaction or by an output of the first transaction.

Each time a locking script is referenced, that locking may be copied to a script template, i.e. a "to-be-executed script". When the off-chain function has finished executing all of the referenced locking scripts, the script template will comprise the contents of the referenced locking scripts, other than the OP_RETURN opcodes within those locking scripts. In other words, the script template has a script that has all loops unpacked, which can be used to construct a locking script without OP_RETURN for a new transaction.

Put another way, consider that there is a first transaction that contains multiple outputs, and that there is a second transaction that references one of the outputs in the first transaction. The following steps may be performed.

Step 1: check if there is OP_RETURN in the locking script of the referenced output. If there is, then extract all locking scripts from the first transaction and index them accordingly.
Step 2; assuming OP RETURN does exist, copy the unlocking script and the locking script referenced by the unlocking script to a to-be-executed script.
Step 3: execute the to-be-executed script.
Step 4: when OP_RETURN is called, the first element on the stack is consumed.
Step 5: assuming the first element that is consumed is a valid index, the locking script that is referenced by the element that was consumed by OP_RETURN in step 4 is now copied to the beginning of the to-be-executed script.
Step 6: execution continues.

As an example, a first transaction may have the following locking scripts:
Locking script 1: [function 1] OP_2 OP_RETURN
Locking script 2: [function 2]
Locking script 3: OP_1 OP_RETURN A second transaction may have an unlocking script for locking script 3: x So there are 3 locking scripts from the first transaction, and one unlocking script from the second transaction that references the third output in the first transaction. Functions 1 and 2 are functions within the respective locking scripts, e.g. they may push and/or operate on data on the stack. Functions 1 and 2 are executed because locking script 3 is executed first, enabling locking script 1 (which contains function 1) to be executed, which then enables locking script 2 (which contains function 2) to be executed.

To execute the transaction:
1. x is pushed to the stack
2. locking script 3 is executed
3. locking script 1 is called
4. function 1 is executed
5. locking script 2 is called
6. function 2 is executed
7. execution ends When OP_RETURN is called, the unlocking script is not re-executed, nor is any other unlocking script executed. The execution of the locking scripts is off chain.

The off-chain function acts as an off-block (or off-chain) script interpreter. Such an interpreter can help users in constructing complicated scripts to implement in locking scripts and smart contracts. On-chain, OP_RETURN is configured to terminate script execution whilst not invalidating transactions when it is called during any validation of transactions. Off-chain, the off-block script interpreter adds a new feature to OP_RETURN. The new feature uses OP_RETURN to construct composite script functions that contain loops. Some blockchain scripting languages do not allow loops. Therefore, any loop in the constructed function will be unpacked before they are put into a locking script.

Figure 6A:
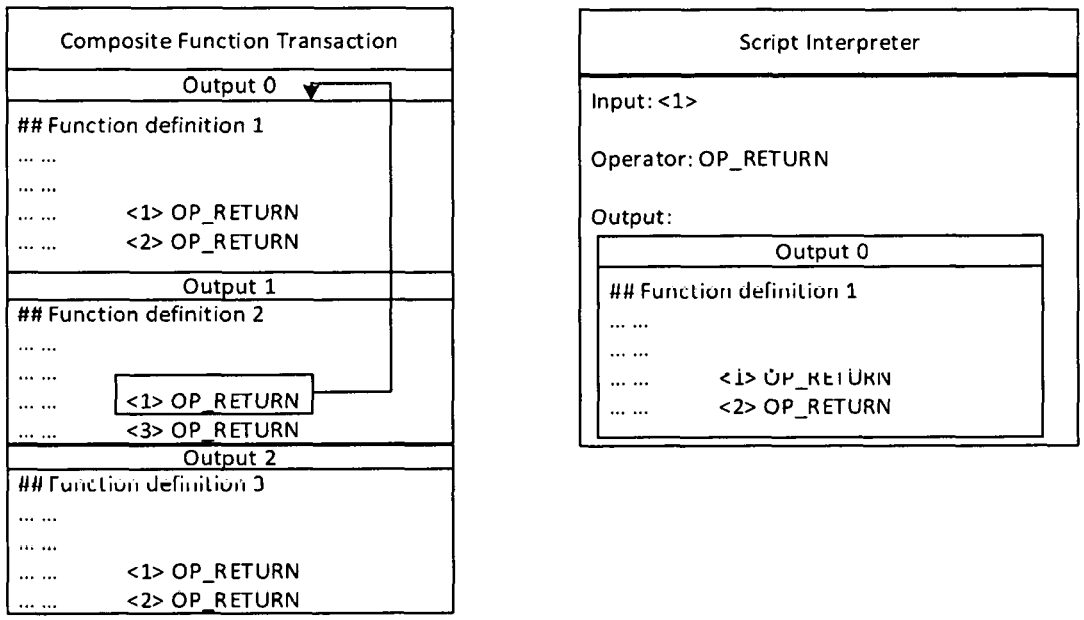
FIG. 6a illustrates an example of the off-block script interpreter as it jumps to outpoint address 1 within output 0 of the composite function transaction.
Figure 6B:
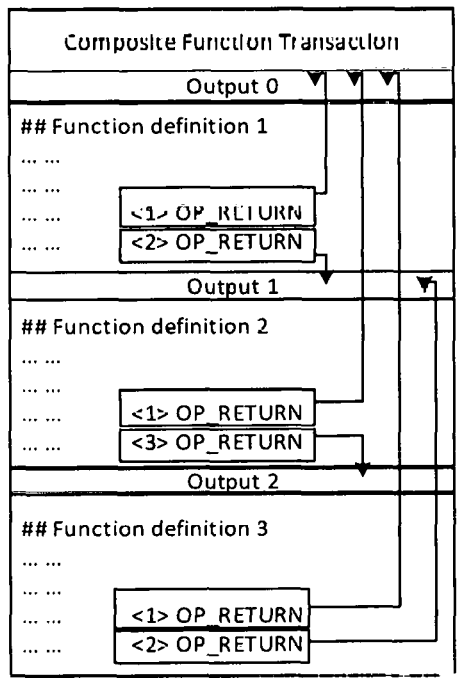
FIG. 6b illustrates an example of a composite function transaction that incorporates many possible jumps between its outpoints.

The off-chain function makes use of a single transaction having multiple outpoints (outpoints and outputs are used interchangeably). The off-block definition of OP_RETURN will allow a jump from one outpoint to another within the transaction, where the outpoint index given by the top item on the stack is used to indicate the outpoint to jump to. This is illustrated in FIGS. 6a and 6b and can be described as follows:

Each outpoint of the transaction contains a locking script. For each outpoint, this locking script can be thought of as a single function. Each outpoint is referenced by a unique OA, which is the index of the outpoint in the transaction.

There is one outpoint that can be thought of as the 'main' function and which is executed first. This could, for example be the last outpoint of the transaction.

Note that transaction outpoints are indexed from 0, which is a special value that is usually reserved for failing scripts when followed by OP_RETURN. In what follows it is assumed for brevity that outpoints are indexed from 1.

Upon executing OP_RETURN, the off-block script interpreter jumps to the OA given by the top item of the stack, adds the opcodes in the locking script to the instruction set, and then continues execution as before. Aside from popping the top item, the Main stack and Alt-stack remain unchanged.

As shown in FIGS. 6a and 6b, the script interpreter performs the following tasks:
Input: <OA>
Operator: OP_RETURN
Output: [Locking SCRIPT from <OA>], <OA> is consumed.

It is important to highlight that other than the execution of OP_RETURN, the script interpreter is the same as the script interpreter that validates transactions. The above construction allows a transaction to be interpreted as a template for a composite function in script. In cases where the function can be compiled, it may be written out in a single outpoint where all the loops would have to be unpacked, and the result is a long and complicated piece of code. However, in embodiments of the present invention, all the logic is contained within separate outpoints of the transaction, which may be significantly smaller in size. This logic is more easily digestible and is more closely related to Forth. More specifically, this improves readability of the code, reduces the codebase, and allows for unit testing.

If unspent, a transaction of this form will be stored in the UTXO set which can be thought of as a universal 'memory' for bitcoin in terms of logging data for future reference. The transaction contains everything needed to construct the composite function—no other high-level language is needed. This enables a universally agreed upon set of composite functions. This is particularly useful for functions that are likely to be repeated in many applications, for example elliptic curve point multiplication, which will be described below.

This also allows the UTXO set to be used as a decentralised repository for Turing complete code snippets. Other than storing a set of useful composite functions, this repository can be used to outsource the processing of calculations that are computationally difficult to perform but easy to verify. The solution to such calculations can then be transferred on the blockchain, where digital assets are redeemable by providing accurate solutions that are verifiable in script. Another possible use case is to use the UTXO set as a decentralised repository for smart contracts.

In order to avoid such transactions in the UTXO set from being spent, the transaction creator Alice could add an OP_CHECKSIGVERIFY (requiring her signature) at the beginning of the locking script. When interpreting the script this part could be safely ignored. Alternatively, a partial transaction can be constructed containing the outpoints as described above, but with no inputs, which is enough to define a function. Once the composite functions have been utilised to Alice's satisfaction, the transaction can either be completed and submitted, or discarded.

Use Case—Euclidean Algorithm

As an example, a transaction TX_[Euclidean_algorithm] may be generated that has two outpoints that comprise the Euclidean algorithm. The inputs of the transaction have been left blank to emphasise the outpoints.

| TX_[Euclidean_algorithm] | | |
|---|---|---|
| Inputs | | Outputs |
| | 1 | OP_TUCK OP_MOD OP_DUP OP_IF <1> OP_RETURN OP_ENDIF |
| | 2 | <1> OP_RETURN OP_DROP |

The Euclidean algorithm takes two inputs (a, b), and outputs the greatest common divisor (GCD) of a and h. For simplicity, we will assume that a>b.

Note that, by design, whenever "<i> OP_RETURN" is called, the off-block interpreter will replace these two items with the entire script stored in the $i^{th}$ outpoint. The looping feature is achieved by having "<i> OP_RETURN" in the $i^{th}$ outpoint. In this use case, the last outpoint of the transaction is the main function and will be called first. Any call to "<1> OP_RETURN" will be replaced by "OP_TUCK OP_MOD OP_DUP OP_IF <1> OP_RETURN OP_ENDIF". The example is illustrated in FIG. 7. Step-by-step, the execution is as follows:

1) The input is pushed to the stack first.

2) The main function "<1> OP_RETURN OP_DROP" is called.

3) "<1> OP_RETURN" is replaced by "OP_TUCK OP_MOD OP_DUP OP_IF<1> OP_RETURN OP_ENDIF".

4) "OP_TUCK OP_MOD OP_DUP OP_IF" is executed

5) Proceed to "<1> OP_RETURN" inside the if-statement as the input is non-zero.

6) "<1> OP_RETURN" is replaced by "OP_TUCK OP_MOD OP_DUP OP_IF <1> OP_RETURN OP_ENDIF".

7) "OP_TUCK OP_MOD OP_DUP OP_IF" is executed.

8) Proceed to "<1> OP_RETURN" inside the if-statement as the input is non-zero.

9) "<1> OP_RETURN" is replaced by "OP_TUCK OP_MOD OP_DUP OP_IF<1> OP_RETURN OP_ENDIF".

10) "OP_TUCK OP_MOD OP_DUP OP_IF" is executed.

11) Proceed to "OP_ENDIF" directly as the input is zero to close the if-statement in step 9.

12) Proceed to "OP_ENDIF" to close the if-statement in step 6.

13) Proceed to "OP_ENDIF" to close the if-statement in step 3.

14) Back to the main function and proceed to "OP_DROP".

15) The result is left on top of the stack.

Use Case—Elliptic Curve Point Multiplication

For simplicity, the use case involves three functions abbreviated as [DECIMAL_TO_BINARY], [POINT_ADD], and [POINT_DOUBLE].

[DECIMAL_TO_BINARY] consumes the first element d on the stack and pushes the following output to the stack <2> <$d_n$> ... <$d_0$>, where <2> is an indicator first element to be pushed in the sequence (used to signal the end of the binary sequence) and $\Sigma_{i=0}^{n} d_i 2^i = d$. Note that the first element on the stack will be $d_0$.

[POINT_ADD] consumes the first two elements $P_1$ and $P_2$ on the stack and pushes the point addition of $P_1$ and $P_2$ to the stack.

[POINT_DOUBLE], which is interchangeable with OP_DUP [POINT_ADD], consumes the first element P on the stack and pushes the point 2P to the stack.

TX_[POINT_MUL] is a transaction that contains a composite script function for elliptic curve point multiplication.

| TX_[POINT_MUL] | |
| --- | --- |
| Inputs | Outputs |
| | 1  [DECIMAL_TO_BINARY] |
| | 2  [POINT_ADD] |
| | 3  [POINT_DOUBLE] |
| | 4  OP_SWAP OP_DUP |
| |    OP_IF |
| |      OP_1 OP_EQUAL |
| |      OP_IF |
| |        < 3 > OP_RETURN |
| |        OP_DUP OP_TOALTSTACK OP_1 OP_TOALTSTACK |
| |        < 4 > OP_RETURN |
| |      OP_ENDIF |
| |    OP_ELSE |
| |      OP_DROP < 3 > OP_RETURN < 4 > OP_RETURN |
| |    OP_ENDIF |
| | 5  OP_FROMALTSTACK |
| |    OP_IF |
| |      OP_FROMALTSTACK < 2 > OP_RETURN < 5 > |
| |      OP_RETURN |
| |    OP_ENDIF |
| | 6  OP_TOALTSTACK < 1 > OP_RETURN OP_FROMALTSTACK OP_0 |
| |    OP_TOALTSTACK OP_SWAP |
| |    OP_IF |
| |      OP_DUP OP OP_TOALTSTACK OP_1 OP_TOALTSTACK |
| |    OP_ENDIF |
| |    < 4 > OP_RETURN OP_DROP |
| |    OP_FROMALTSTACK |
| |    OP_IF |
| |      OP_FROMALTSTACK < 5 > OP_RETURN |
| |    OP_ENDIF |

The main function, which is represented by the last outpoint in the above transaction, takes two inputs (a, G), and outputs a·G. The example is illustrated in FIG. 8. Note that "<i> OP_RETURN" is replaced with the entire script from the $i^{th}$ outpoint whenever OP_RETURN is encountered. A step-by-step explanation of what the script is doing is as follow, where it is assumed that the input (a, G) is pushed to the stack, where G is the first element on the stack:

The main function (outpoint 6) is called.
1) Push G to the ALT stack.
2) Call [DECIMAL_TO_BINARY] to obtain the binary representation of a.
3) Move G back from the ALT stack.
4) Push 0 to the ALT stack. This 0 help to identify when the bottom of the ALT stack is reached.
5) Initially, deal with the first (least significant) bit of a. If it is 1, push G to the ALT stack.
6) Then push 1 to the ALT stack. This 1 indicates that there is a non-zero element next to it on the ALT stack.
7) Outpoint 4 is called continuously until encountering 2 (indicating the end of the binary sequence) on Main stack.
8) Outpoint 4 doubles the point, and if the binary bit is 1, it pushes the result to the ALT stack followed by 1 (as described in Step 6).
9) When Outpoint 4 is complete, there will be a list of points on the ALT stack to be added together.
10) Move the first point from the ALT stack to the main stack, and call Outpoint 5 to start point additions.
11) Upon reaching the end of the ALT stack, the expected result will be on the main stack.

It will be appreciated that the above embodiments have been described by way of example only. To be clear, embodiments are not limited to an opcode having a particular name. Rather, the embodiments are limited to an opcode having a particular function. The term "OP_RETURN" has been used for the sake of brevity.

According to a first instantiation of the teachings disclosed herein, there is provided a computer-implemented method of validating transactions for recordal in a blockchain, the method comprising receiving one or more transactions at a node of a blockchain network, and for each received transaction applying a protocol for validating the transaction, wherein the protocol is configured to: allow a termination opcode to be included in an output script of the transaction, wherein the termination opcode is configured to, upon being executed by the node, a) terminate execution of the output script, and b) not to invalidate the transaction based only on the inclusion of the termination opcode in the output script; and disallow any instance of the termination opcode from being included in an input script of the transaction, said disallowing comprising the node at least invalidating the transaction if any instance of the termination opcode is included in the input script.

That is the transaction is not invalidated purely because there is a termination opcode in the output script. Put another way, the transaction is not invalidated on the basis of the termination opcode in the output script per se, but it could be invalidated for other reasons, as discussed.

According to a second, optional instantiation, there may be provided a method in accordance with the first instantiation, wherein the output script may be a locking script included in the transaction and the input script may be an unlocking script included in the transaction for unlocking a locking script of a previous transaction.

According to a third, optional instantiation, there may be provided a method in accordance with the first or second instantiations, wherein the protocol may be configured such that: when the output script includes a combination of an instance of the termination opcode preceded by at least one data element, to invalidate the transaction based on the combination of the instance of the termination opcode and the at least one data element.

In some examples, for the transaction to be invalidated based on said combination, the instance of the termination opcode must be immediately preceded by the at least one data element. I.e. the at least one data element and the terminate opcode are adjoining elements of the output script. The provably unspendable output enables data storage (e.g. of contracts, media files, documents, etc.) on the blockchain.

The data element may be any element of the script (e.g. a function, a string, an opcode, etc.).

According to a fourth, optional instantiation, there may be provided a method in accordance with the third instantiation, wherein the at least one data element may comprise one or both of: a zero opcode; or a representation of a zero value, in order to create a provably unspendable output of the transaction.

According to a fifth, optional instantiation, there may be provided a method in accordance with any of the first to fourth instantiations, wherein the protocol may be configured to disallow any opcode from being included in the input script of the transaction, said disallowing comprising the node at least invalidating the transaction if any opcode is included in the input script.

According to a sixth, optional instantiation, there may be provided a method in accordance with any of the first to fifth instantiations, wherein said validating may comprise at least one of: resulting in a non-empty and a non-zero result after an execution, by the node, of a combination of the output script and the input script; the node forwarding the transaction to one or more nodes of the network for recordal in the blockchain; and the node recording the transaction in the blockchain.

According to a seventh, optional instantiation, there may be provided a method in accordance with any of the first to sixth instantiations, wherein the method may comprise executing transactions of the blockchain network according to the protocol, wherein a first transaction comprises at least a first output comprising a first locking script of a stack-based scripting language, wherein the first locking script comprises a portion of the first locking script to be executed before a first instance of the termination opcode is executed; wherein a second transaction comprises a first unlocking script that references the first output in the first transaction, wherein the method may comprise, upon executing the first instance of the termination opcode: terminating execution of the first locking script whilst not invalidating the first transaction; reading a first data element from at least one stack, wherein the first data element is generated during execution of the first unlocking script and the portion of the first locking script; and supplying, to an off-chain function, said first data element as read from the at least one stack, wherein the function is configured to generate a result based on at least said first data element.

According to an eighth, optional instantiation, there may be provided a method in accordance with the seventh instantiation, wherein said reading of the first data element may comprise recording the first data element on the off-chain stack, and wherein said supplying may comprise supplying said first data element to the off-chain function as read from the at least one off-chain stack.

According to a ninth, optional instantiation, there may be provided a method in accordance with the seventh or eighth instantiations, wherein said generating may comprise generating, as the result, a further transaction of the blockchain network.

According to a tenth, optional instantiation, there may be provided a method in accordance with the ninth instantiation, wherein said generating of the further transaction may comprise generating an input of the further transaction, wherein the input is based on at least said first data element.

According to an eleventh, optional instantiation, there may be provided a method in accordance with the ninth or tenth instantiations, wherein the method may comprise transmitting said further transaction to one or more nodes of the blockchain network.

According to a twelfth, optional instantiation, there may be provided a method in accordance with any of the ninth to eleventh instantiations, wherein the method may comprise executing a third transaction of the blockchain network, wherein the third transaction comprises at least a second output comprising a second locking script of the stack-based scripting language, wherein the second locking script comprises a portion of the second locking script to be executed before a second instance of the termination opcode is executed; wherein the further transaction comprises a second unlocking script that references the second output in third transaction, and wherein the method may comprise, upon executing the second instance of the termination opcode of the further transaction: terminating execution of the second locking script whilst not invalidating the further transaction; reading a second data element from the at least one stack, wherein the second data element is generated during execution of the second unlocking script and the portion of the second locking script; and supplying, to the off-chain function, said second data element as read from the at least one stack, wherein the function is configured to generate a further result based on al least said second data element.

According to a thirteenth, optional instantiation, there may be provided a method in accordance with the seventh instantiation, wherein the first transaction may comprise a plurality of outputs each comprising a respective locking script, wherein each of the plurality of outputs is referenced by a respective output address, wherein said first data element is an output address referencing a second one of said outputs, and wherein the first output is referenced in the unlocking script of the second transaction; and wherein the off-chain function is configured to, upon calling the first instance of the termination opcode, use the output address as read from the stack to reference a locking script of the second output.

According to a fourteenth, optional instantiation, there may be provided a method in accordance with the thirteenth instantiation, wherein the method may comprise executing the unlocking script and the first locking script, said execution comprising pushing the output address of the second output to the stack.

According to a fifteenth, optional instantiation, there may be provided a method in accordance with the fourteenth instantiation, wherein the method may comprise, before said execution of the unlocking script and the first locking script, copying the unlocking script and the first locking script to a script template, wherein the script template comprises to-be-executed script.

According to a sixteenth, optional instantiation, there may be provided a method in accordance with the fifteenth instantiation, wherein the method may comprise, upon calling the first instance of the termination opcode, copying the locking script of the second output to the beginning of the script template.

According to a seventeenth, optional instantiation, there may be provided a method in accordance with any of the thirteenth to sixteenth instantiations, wherein the method may comprise executing the locking script of the second output.

According to an eighteenth, optional instantiation, there may be provided a method in accordance with the seventeenth instantiation, wherein the locking script of the second output may comprise a portion of script to be executed before a second instance of the termination opcode, said portion comprising an output address referencing a third one of said outputs; and wherein said execution of the locking script of the second output may comprise: pushing the output address of the third output to the stack; and wherein the function is configured to, upon calling the second instance of the termination opcode, use the output address as read from the stack to reference a locking script of the third output.

According to a nineteenth, optional instantiation, there may be provided a method in accordance with the eighteenth instantiation, wherein the method may comprise, upon calling the second instance of the termination opcode, copying the locking script of the third output to the beginning of the script template.

According to a twentieth, optional instantiation, there may be provided a method in accordance with the eighteenth or nineteenth instantiations, wherein the first, second and third outputs may be sequentially listed in the plurality of outputs.

According to a twenty first, optional instantiation, there may be provided a method in accordance with the eighteenth or nineteenth instantiations, wherein the first, second and third outputs may not be sequentially listed in the plurality of outputs.

According to a twenty second, optional instantiation, there may be provided a method in accordance with any of the thirteenth to twenty first instantiations, wherein the method may comprise performing operations of: execute a locking script of a referenced output, push an output address of the respective output to the off-chain stack, wherein the function is configured to, upon calling the respective instance of the termination opcode of the respective output, use the output address as read from the stack to reference a locking script of a next one of the outputs; wherein the operations are repeated until each locking script of the plurality of outputs that is referenced by another locking script has been executed.

According to a twenty third, optional instantiation, there may be provided a method in accordance with the twenty second instantiation, wherein the method may comprise, each time one of the locking scripts is executed, copying that locking script to the beginning of the script template.

According to a twenty fourth, optional instantiation, there may be provided a method in accordance with the twenty third instantiation, wherein the method may comprise, using the script template as a locking script for a further transaction, wherein the locking script for the further transaction contains no instance of the termination opcode.

According to a twenty fifth, optional instantiation, there may be provided a method in accordance with any of the thirteenth to twenty fourth instantiations, wherein one or more of the locking scripts may comprise a respective function, and wherein said execution of that respective locking scripts may comprise executing the respective function.

According to a twenty sixth, optional instantiation, there may be provided a method in accordance with the twenty fifth instantiation, wherein the respective function may be configured to operate on data on the off-chain stack at the time the respective function is executed.

According to a twenty seventh, optional instantiation, there may be provided a method in accordance with any of the thirteenth to twenty sixth instantiations, wherein the method may comprise, if the first locking script comprises an in instance of the termination opcode, extracting all locking scripts from the first transaction and index them with a respective output address.

According to a twenty eighth, optional instantiation, there may be provided a method in accordance with any of the thirteenth to twenty seventh instantiations, wherein each output address in each locking script may be a respective data element, and wherein the function may be configured to interpret the respective data element as an output address.

According to a twenty ninth instantiation of the teachings disclosed herein, there is provided a computer program embodied on computer-readable storage and configured so as, when run on the node of the blockchain network, to perform the method of any of the first to twenty eighth instantiations.

According to a thirtieth instantiation of the teachings disclosed herein, there is provided computing equipment comprising: memory comprising one or more memory units; and processing apparatus comprising one or more processing units, wherein the memory stores code arranged to run on the processing apparatus, the code being configured so as when run on the processing apparatus to carry out the method of any of the first to twenty eighth instantiations.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of validating transactions for recordal in a blockchain, the method comprising receiving one or more transactions at a node of a blockchain network, and for each received transaction applying a protocol for validating the transaction, wherein the protocol is configured to:
   allow a termination opcode to be included in an output script of the transaction, wherein the termination opcode is configured to, upon being executed by the node, a) terminate execution of the output script, and b) not to invalidate the transaction based only on the inclusion of the termination opcode in the output script; and
   disallow any instance of the termination opcode from being included in an input script of the transaction, said disallowing comprising the node at least invalidating the transaction if any instance of the termination opcode is included in the input script.

2. The method of claim 1, wherein the output script is a locking script included in the transaction and the input script is an unlocking script included in the transaction for unlocking a locking script of a previous transaction.

3. The method of claim 1, wherein the protocol is configured such that:
   when the output script includes a combination of an instance of the termination opcode preceded by at least one data element, to invalidate the transaction based on the combination of the instance of the termination opcode and the at least one data element.

4. The method of claim 3, wherein the at least one data element comprises one or both of:
   a zero opcode; or
   a representation of a zero value, in order to create a provably unspendable output of the transaction.

5. The method of claim 1, wherein the protocol is configured to:
disallow any opcode from being included in the input script of the transaction, said disallowing comprising the node at least invalidating the transaction if any opcode is included in the input script.

6. The method of claim 1, wherein said validating comprises at least one of:
resulting in a non-empty and a non-zero result after an execution, by the node, of a combination of the output script and the input script;
the node forwarding the transaction to one or more nodes of the network for recordal in the blockchain; and
the node recording the transaction in the blockchain.

7. The method of claim 1, comprising executing transactions of the blockchain network according to the protocol, wherein a first transaction comprises at least a first output comprising a first locking script of a stack-based scripting language, wherein the first locking script comprises a portion of the first locking script to be executed before a first instance of the termination opcode is executed; wherein a second transaction comprises a first unlocking script that references the first output in the first transaction, the method comprising, upon executing the first instance of the termination opcode:
terminating execution of the first locking script whilst not invalidating the first transaction;
reading a first data element from at least one stack, wherein the first data element is generated during execution of the first unlocking script and the portion of the first locking script; and
supplying, to an off-chain function, said first data element as read from the at least one stack, wherein the function is configured to generate a result based on at least said first data element.

8. The method of claim 7, wherein said reading of the first data element comprises recording the first data element on an off-chain stack, and wherein said supplying comprises supplying said first data element to the off-chain function as read from the at least one off-chain stack.

9. The method of claim 7, wherein said generating comprises generating, as the result, a further transaction of the blockchain network.

10. The method of claim 9, wherein said generating of the further transaction comprises generating an input of the further transaction, wherein the input is based on at least said first data element.

11. The method of claim 9, comprising transmitting said further transaction to one or more nodes of the blockchain network.

12. The method of claim 9, comprising executing a third transaction of the blockchain network, wherein the third transaction comprises at least a second output comprising a second locking script of the stack-based scripting language, wherein the second locking script comprises a portion of the second locking script to be executed before a second instance of the termination opcode is executed; wherein the further transaction comprises a second unlocking script that references the second output in third transaction, and wherein the method comprises, upon executing the second instance of the termination opcode of the further transaction:
terminating execution of the second locking script whilst not invalidating the further transaction;
reading a second data element from the at least one stack, wherein the second data element is generated during execution of the second unlocking script and the portion of the second locking script; and
supplying, to the off-chain function, said second data element as read from the at least one stack, wherein the function is configured to generate a further result based on at least said second data element.

13. The method of claim 7, wherein the first transaction comprises a plurality of outputs each comprising a respective locking script, wherein each of the plurality of outputs is referenced by a respective output address, wherein said first data element is an output address referencing a second one of said outputs, and wherein the first output is referenced in the unlocking script of the second transaction; and
wherein the off-chain function is configured to, upon calling the first instance of the termination opcode, use the output address as read from the stack to reference a locking script of the second output.

14. The method of claim 13, comprising executing the unlocking script and the first locking script, said execution comprising pushing the output address of the second output to the stack.

15. The method of claim 13, comprising executing the locking script of the second output, wherein the locking script of the second output comprises a portion of script to be executed before a second instance of the termination opcode, said portion comprising an output address referencing a third output of said outputs; and wherein said execution of the locking script of the second output comprises:
pushing the output address of the third output to the stack; and
wherein the function is configured to, upon calling the second instance of the termination opcode, use the output address as read from the stack to reference a locking script of the third output.

16. The method of claim 15, comprising, upon calling the second instance of the termination opcode, copying the locking script of the third output to a beginning of the script template.

17. The method of claim 13, comprising performing operations of:
executing a locking script of a referenced output, pushing an output address of the respective output to the off-chain stack, wherein the function is configured to, upon calling the respective instance of the termination opcode of the respective output, using the output address as read from the stack to reference a locking script of a next one of the outputs;
wherein the operations are repeated until each locking script of the plurality of outputs that is referenced by another locking script has been executed.

18. The method of claim 13, wherein one or more of the locking scripts comprises a respective function, and wherein said execution of that respective locking scripts comprises executing the respective function, and wherein the respective function is configured to operate on data on the off-chain stack at a time the respective function is executed.

19. A computer program embodied on a non-transitory computer-readable storage medium and configured so as, when run on a node of a blockchain network, to perform a method of validating transactions for recordal in a blockchain, the method comprising receiving one or more transactions at a node of a blockchain network, and for each received transaction applying a protocol for validating the transaction, wherein the protocol is configured to:
allow a termination opcode to be included in an output script of the transaction, wherein the termination opcode is configured to, upon being executed by the node, a) terminate execution of the output script, and b)

not to invalidate the transaction based only on the inclusion of the termination opcode in the output script; and disallow any instance of the termination opcode from being included in an input script of the transaction, said disallowing comprising the node at least invalidating the transaction if any instance of the termination opcode is included in the input script.

20. Computing equipment comprising:

memory comprising one or more memory units; and processing apparatus comprising one or more processing units, wherein the memory stores code arranged to run on the processing apparatus, the code being configured so as when run on the processing apparatus causes the processing apparatus to carry out a method of validating transactions for recordal in a blockchain, the method comprising receiving one or more transactions at a node of a blockchain network, and for each received transaction applying a protocol for validating the transaction, wherein the protocol is configured to:

allow a termination opcode to be included in an output script of the transaction, wherein the termination opcode is configured to, upon being executed by the node, a) terminate execution of the output script, and b) not to invalidate the transaction based only on the inclusion of the termination opcode in the Output script; and disallow any instance of the termination opcode from being included in an input script of the transaction, said disallowing comprising the node at least invalidating the transaction if any instance of the termination opcode is included in the input script.

* * * * *